US012722805B2

(12) United States Patent
Wilder et al.

(10) Patent No.: US 12,722,805 B2
(45) Date of Patent: Sep. 1, 2026

(54) AUTO-LOCATING AND LOCKING MOVABLE GANTRY SYSTEM

(71) Applicant: Wilder Systems Inc., Austin, TX (US)

(72) Inventors: William Wilder, Austin, TX (US); Eugene Won Kim, Austin, TX (US)

(73) Assignee: WILDER SYSTEMS INC., Austin, TX (US)

( * ) Notice: Subject to any disclaimer, the term of this patent is extended or adjusted under 35 U.S.C. 154(b) by 85 days.

(21) Appl. No.: 18/338,253

(22) Filed: Jun. 20, 2023

(65) Prior Publication Data

US 2023/0415347 A1 Dec. 28, 2023

Related U.S. Application Data

(60) Provisional application No. 63/482,491, filed on Jan. 31, 2023, provisional application No. 63/481,578, (Continued)

(51) Int. Cl.
*B64F 5/40* (2017.01)
*B25J 5/00* (2006.01)
(Continued)

(52) U.S. Cl.
CPC *B64F 5/40* (2017.01); *B25J 5/00* (2013.01); *B25J 5/007* (2013.01); *B25J 9/1664* (2013.01);
(Continued)

(58) Field of Classification Search
CPC ... B25J 5/00; B25J 5/007; B25J 9/1664; B25J 9/1666; B25J 9/1694; G05B 19/4155;
(Continued)

(56) References Cited

U.S. PATENT DOCUMENTS 5,359,542 A 10/1994 Pahmeier et al.
6,587,752 B1 7/2003 Saito
(Continued)

FOREIGN PATENT DOCUMENTS

CN 111846270 A 10/2020
CN 115167431 A 10/2022
(Continued)

OTHER PUBLICATIONS

Oridate , "Velocity-Based Robot Motion Planner for Under-Constrained Trajectories with Part-Specific Geometric Variances", The University of Texas, Dec. 2021, 178 pages.
(Continued)

*Primary Examiner* — Nhi Q Bui
(74) *Attorney, Agent, or Firm* — Kilpatrick Townsend & Stockton LLP

(57) ABSTRACT

The present disclosure relates to system for auto-docking a robot to jig holding an airplane part to execute a job. In an example, a robot is tasked with performing an operation associated with an airplane part held by or affixed to a jig. To do so, the robot may utilize sensor input from associated sensors to identify the jig, the airplane part, and determine a particular template associated with the jig and airplane part. The particular template may specify a threshold distance which the robot needs to move towards the jig and dock itself near the jig in order to execute the job associated with the airplane part. Once a particular template is identified, the robot may be instructed to move towards the jig using the input from the associated sensors until it reaches the threshold distance.

20 Claims, 8 Drawing Sheets

Related U.S. Application Data filed on Jan. 25, 2023, provisional application No. 63/354,219, filed on Jun. 21, 2022.

(51) Int. Cl.

| | |
|---|---|
| ***B25J 9/16*** | (2006.01) |
| ***G05B 19/4155*** | (2006.01) |
| ***G05D 1/00*** | (2006.01) |
| ***G05D 1/249*** | (2024.01) |
| ***G06T 7/60*** | (2017.01) |
| ***G06T 7/73*** | (2017.01) |
| ***G07C 5/00*** | (2006.01) |
| ***G07C 5/08*** | (2006.01) |

(52) U.S. Cl.

CPC ........... *B25J 9/1666* (2013.01); *B25J 9/1694* (2013.01); *G05B 19/4155* (2013.01); *G05D 1/0231* (2013.01); *G05D 1/249* (2024.01); *G06T 7/60* (2013.01); *G06T 7/74* (2017.01); *G07C 5/008* (2013.01); *G07C 5/085* (2013.01); *G05B 2219/40269* (2013.01); *G06T 2200/04* (2013.01); *G06T 2207/10028* (2013.01); *G06T 2207/20081* (2013.01); *G06T 2207/20084* (2013.01)

(58) Field of Classification Search

CPC ....... G05B 2219/40269; G05D 1/0231; G05D 1/249; G06T 7/60; G06T 7/74; G06T 2200/04; G06T 2207/10028; G06T 2207/20081; G06T 2207/20084; G07C 5/008; G07C 5/085; B64F 5/40

See application file for complete search history.

(56) References Cited

U.S. PATENT DOCUMENTS

| | | | | |
|---|---|---|---|---|
| 9,064,161 | B1 | 6/2015 | Boman et al. | |
| 11,807,400 | B1 | 11/2023 | Voiss et al. | |
| 11,880,995 | B2 | 1/2024 | Voiss et al. | |
| 12,258,147 | B2 | 3/2025 | Voiss et al. | |
| 2004/0245481 | A1 | 12/2004 | Avnery | |
| 2016/0093054 | A1* | 3/2016 | Song | G06T 7/74 382/154 |
| 2016/0264262 | A1 | 9/2016 | Colin et al. | |
| 2017/0351239 | A1* | 12/2017 | Wilder | B25J 9/1687 |
| 2018/0001476 | A1* | 1/2018 | Tan | B61G 7/04 |
| 2018/0275632 | A1 | 9/2018 | Zhang et al. | |
| 2018/0329501 | A1* | 11/2018 | Marchenko | G06F 3/038 |
| 2019/0142519 | A1* | 5/2019 | Siemionow | A61B 34/25 600/408 |
| 2019/0147221 | A1 | 5/2019 | Grabner et al. | |
| 2019/0291275 | A1 | 9/2019 | Szarski et al. | |
| 2019/0314990 | A1 | 10/2019 | Sugaki et al. | |
| 2020/0088524 | A1* | 3/2020 | Shin | G06V 20/58 |
| 2020/0133002 | A1* | 4/2020 | Yamazaki | G02B 27/0101 |
| 2020/0254982 | A1 | 8/2020 | Karaburun | |
| 2020/0353511 | A1 | 11/2020 | Larsson et al. | |
| 2020/0356068 | A1* | 11/2020 | O'Hare | G05B 19/409 |
| 2021/0232141 | A1 | 7/2021 | Georgeson et al. | |
| 2022/0066456 | A1 | 3/2022 | Ebrahimi Afrouzi et al. | |
| 2022/0088780 | A1 | 3/2022 | Abdul-Hadi et al. | |
| 2022/0100177 | A1 | 3/2022 | Johnston et al. | |
| 2022/0134561 | A1 | 5/2022 | Graham et al. | |
| 2022/0203552 | A1 | 6/2022 | Lapresti et al. | |
| 2022/0276629 | A1 | 9/2022 | Wilder | |
| 2022/0288787 | A1* | 9/2022 | Dupree | B25J 9/1687 |
| 2023/0021486 | A1 | 1/2023 | Tan et al. | |
| 2023/0126179 | A1 | 4/2023 | Xi et al. | |
| 2023/0410345 | A1 | 12/2023 | Voiss et al. | |
| 2024/0308690 | A1 | 9/2024 | Svanebjerg | |
| 2024/0358873 | A1 | 10/2024 | Falco et al. | |

FOREIGN PATENT DOCUMENTS

| | | | | |
|---|---|---|---|---|
| CN | 115345911 | A | 11/2022 | |
| WO | WO-2022170279 | A1 * | 8/2022 | B25J 9/162 |
| WO | 2023144533 | A1 | 8/2023 | |

OTHER PUBLICATIONS

U.S. Appl. No. 18/339,184 , Non-Final Office Action, Mailed On Sep. 15, 2023, 21 pages.

U.S. Appl. No. 18/339,199 , Notice of Allowance, Mailed On Sep. 13, 2023, 9 pages.

PCT/US2024/013339 , "International Search Report and Written Opinion", Jul. 1, 2024, 17 pages.

"Cleaning and Disinfection Robot »DeKonBot«", FraunhoferIPA, Youtube Video, Available Online at: https://www.youtube.com/watch?v=6Dr7SJ4p-Do, Apr. 1, 2021, 2 pages.

Baumgarten, et al., "Development and Evaluation of a Mobile Manipulation Robot for Surface Disinfection", ISR Europe 2022; 54th International Symposium on Robotics, Jun. 20-21, 2022, pp. 1-8.

Giusti, et al., "Balto: A BIM-Integrated Mobile Robot Manipulator for Precise and Autonomous Disinfection in Buildings against COVID-19", Institute of Electrical and Electronics Engineers 17th International Conference on Automation Science and Engineering (CASE), Aug. 23-27, 2021, pp. 1730-1737.

Ramalingam, et al., "A Human Support Robot for the Cleaning and Maintenance of Door Handles Using a Deep-Learning Framework", Sensors, vol. 20, No. 12, 2020, 18 pages.

PCT/US2024/012961, "International Search Report and Written Opinion", Jul. 28, 2025, 15 pages.

* cited by examiner

AUTO-LOCATING AND LOCKING MOVABLE GANTRY SYSTEM

CROSS-REFERENCE TO RELATED APPLICATIONS

This application claims priority under 35 U.S.C. § 119(e) to U.S. Provisional Application No. 63/354,219, filed on Jun. 21, 2022, U.S. Provisional Application No. 63/482,491, filed on Jan. 31, 2023, and U.S. Provisional Application No. 63/481,578, filed on Jan. 25, 2023, the contents of which are herein incorporated by reference.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of the enterprise's workers.

BRIEF DESCRIPTION OF THE DRAWINGS

Various embodiments in accordance with the present disclosure will be described with reference to the drawings in which.

DETAILED DESCRIPTION

Figure 1:
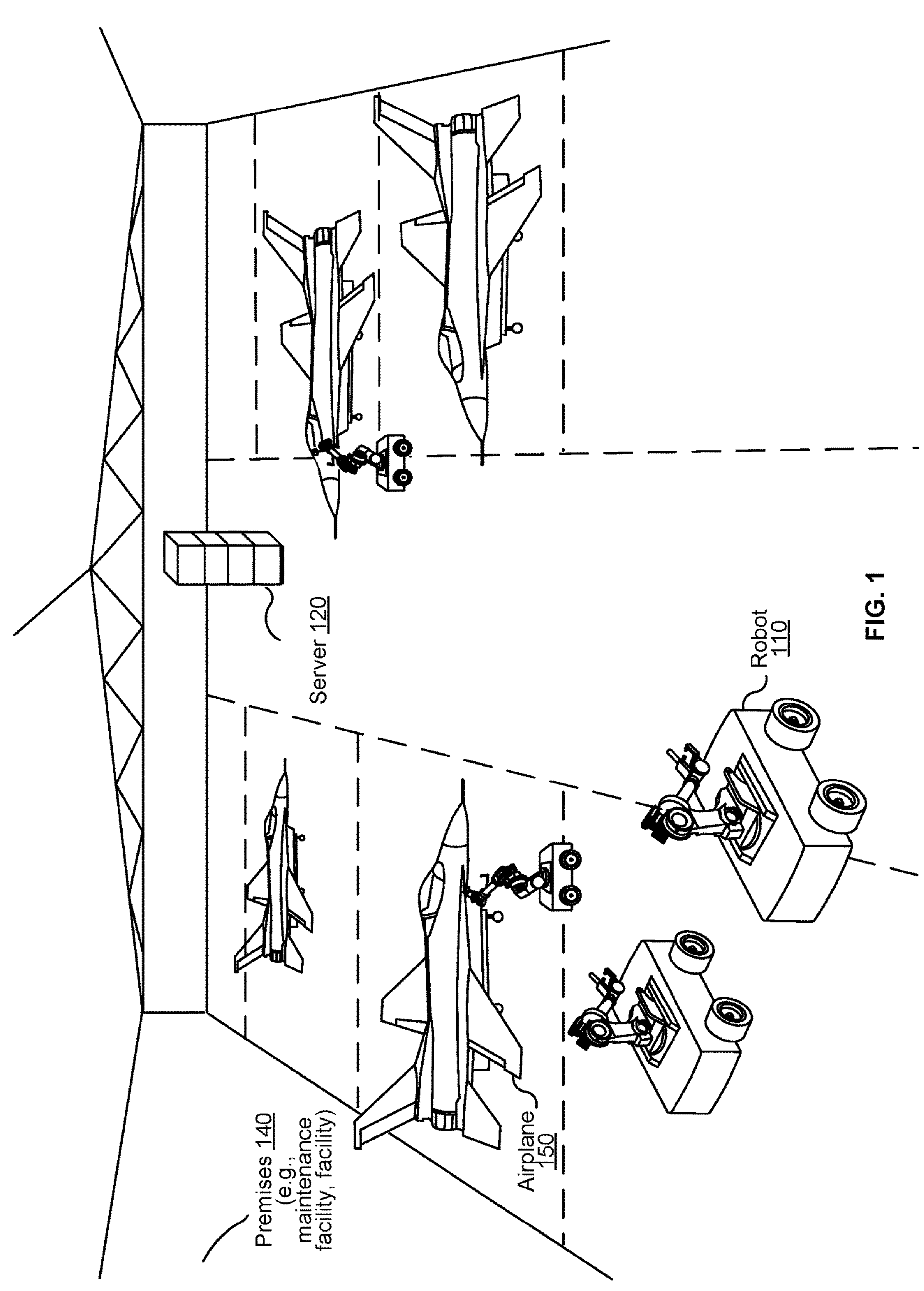
FIG. 1 illustrates an example of a network environment for robotic operations, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Robots can be deployed to perform different operations on targets in an operational environment. For example, robots can be deployed in a facility to perform manufacturing and/or maintenance operations on airplanes or parts thereof. At least some of the operations can be autonomously performed. Performing an autonomous operation involves executing a process that embodies a set of computer algorithms. Several configurations of jigs affixing airplane parts, or other machine parts, with various jobs required to be performed for each machine part may be required in a given facility. The identification of which particular jig, machine part, and job that is required at any given time can be computationally complex and prone to human error. One possible design is to implement a system for automatically identifying the jig, the machine part, and the appropriate job to conduct given the identified parameters. The system may use input from sensors associated with a robot, or external to the robot, to identify the jig and airplane part and determine an appropriate template which specifies instructions for moving the robot, rotating the robot, and executing a job for the airplane part with said robot.

Embodiments of the present disclosure enable a robot to automatically detect when it is near an area that includes a jig and an affixed machine part, determine a template that specifies a distance to move the robot towards the jig to execute a job based on sensor input, and modify an angle or rotation of the robot as well as execute the job once the robot has moved to within a threshold distance from the jig. In the interest of clarity of explanation, such operations are described herein in the context of manufacturing and/or maintaining airplanes or parts thereof, although the embodiments are not limited as such and similarly apply to other vehicles (e.g., boats, automobiles, rockets, etc.) and any type of autonomous robotic operation.

In an example, a facility may utilize a plurality of robots to conduct jobs on machine parts affixed or otherwise held by jigs. Each of the robots can be configured to perform autonomous operations such as docking near (e.g., within a certain distance) of a jig to execute a job for a machine part associated with the jig. When a robot is to perform an autonomous operation, the robot can generate data (e.g., by using one or more associated sensors) for this operation and, generate and execute instructions for implementing the operation. The robot may include one or more sensors for capturing data or sensor input for an area around the robot during execution of the autonomous operations. For example, the robot may include one or more laser sensors which can generate sensor input for determining a distance from the robot to a jig or one or more monuments of a jig. The sensor input captured by the laser sensors can be used by a computer of the robot, or a remote computer in communication with the robot, to determine a presence of one or more monuments, a location of the one or more monuments, and a number of the one or more monuments associated with a jig. In embodiments, the presence, location, and number of monuments associated with a jig can be used to determine a particular template from a plurality of templates maintained by the robot or remote computer. A template may specify a threshold distance at which the robot should park itself or move no closer to the detected jig, a rotation to modify a current rotation of the robot, and a job to execute upon reaching the threshold distance and the updated rotation. In embodiments, the robot may be include one or more light detection and ranging (LIDAR) systems comprised of one or more sensors to obtain information/data about an area around the robot (e.g., generate a three-dimensional (3D) map of the area around the robot). The robot may move towards a jig and associated machine part until a threshold distance is reached by continuously comparing the generated 3D map to a feature map included in a template for the detected jig and machine part.

FIG. 1 illustrates an example of a network environment for robotic operations, according to some embodiments. The example network environment includes a plurality of robots 110 and a local computer system (server) 120. Although FIG. 1 depicts robots 110 and local computer system 120 other computer systems may be used to implement the features of the current disclosure. For example, the robots 110 may have computers which execute the operations described herein for auto-docking to a jig and executing a job. Remote computer systems (e.g., computer systems/servers that are in communication with the local computer system 120 and/or robots 110) (not pictured) may also receive data from said systems 120 and 110 as well as generate instructions which are transmitted, via available networks, to systems 120 and 110. The robots 110, local computer system 120, and remote computer systems are communicatively coupled with each other. Further, the robots 110 and the local computer system 120 can be deployed to be on the same premises, whereas the remote computer systems may be deployed remotely from the premises 140. In the illustration of FIG. 1, the on-premises represents an enclosure 140 that includes airplanes 150 of the airplane model. Autonomous operations by the robots 110 are to be performed on such airplanes 150 and/or parts thereof (e.g., on wings, fuselage sections, etc.).

In an example, the enclosure 140 can be a warehouse, a storage facility, a manufacturing facility, or any other building with controlled access thereto and housing the airplanes 150. The airplanes 150 can be distributed at predefined areas (e.g., bays) within the enclosure 140 or can be scattered without a particular pre-defined arrangement or predefined areas.

The enclosure 140 can also include a parking area for storing or queuing the robots 110 when not performing operations. A robot 110 can be summoned from the parking area to an operational area that contains an airplane 150. The robot 110 can autonomously navigate to the operational area and, once thereat, perform a set of operations to register the airplane 150 (or a part thereof) to then perform another set of operations on the airplane 150 (and/or the airplane part) such as auto-docking the robot 110 within a certain distance of the airplane 150 to execute a job (e.g., drill holes, apply sealant, etc.).

In an example, a robot 110 includes a movable base, a power system, a powertrain system, a navigation system, a sensor system, a robotic arm, an end effector, input and output (I/O) interfaces, and a computer system. The end-effector can support a particular autonomous operation (e.g., drilling) can be a line-replaceable unit with a standard interface, such that the end-effector can be replaced with another one that supports a different autonomous operation (e.g., sealing). The end-effector replacement can be carried by the robot 110 itself or can use a manual process, where an operator can perform the replacement. The I/O interfaces can include a communication interface to communicate with the server 120 and a user interface for manual control of the robot 110, for selection of autonomous operations to be performed by the robot 110, or for selecting a particular template for executing an operation for the airplane 150 or airplane part affixed to or otherwise held by a jig. The computer system can include one or more processors and one or more memory storing instructions that, upon execution by the one or more processors, configure the robot 110 to perform different operations. The instructions can correspond to program codes for the navigation, controls of the power system, controls of the powertrain system (one or more propulsion mechanisms), the collection and processing of sensor data, the controls of the robotic arm, the controls of the end effectors, and/or the communications.

The server 120 can be a hardware computer system that includes one or more I/O interfaces to communicate with the robots 110, one or more processors, and one or more memory storing instructions that, upon execution by the one or more processors, configure the server 120 to perform different operations. The instructions can correspond to program codes for the communications and for processes to be executed locally on the server 120 for a robot 110 given data sent by the robot 110.

The remote computer system (not pictured) can be a hardware computer system or a virtualized computer system on hardware that includes one or more I/O interfaces to communicate with the robot 110 and server 120, one or more processors, and one or more memory storing instructions that, upon execution by the one or more processors, configure the remote computer systems to perform different operations. The instructions can correspond to program codes for the communications and for processes to be executed locally on the remote computer systems.

In an example, wireless communications (e.g., through a wireless network) can be established between the robots 110, the server 120, and the remote computer system. The wireless communications can be protected (e.g., by using encryption). Communications between the server 120 and the remote computer system can be over a public data network (e.g., the Internet) and/or a private data network (e.g., an Intranet). Here also, the communications can be protected (e.g., by using encryption).

In an example, the server 120 and robot 110 are configured to provide electronics manufacturing services (EMS) related to the on-premises 140 in association with the airplane model or airplane parts (machine parts). In this example, the server 120 can send operational instructions to the robot 110 related to an airplane 150 (e.g., having a particular tail number) or a part thereof. The server 120 can maintain status data indicating the operational status and capability data indicating the operational capabilities of each robot 110. The operational status of a robot 110 can be available (e.g., the robot 110 can be deployed), busy (e.g., the robot 110 is already deployed), or unavailable (e.g., the robot 110 is down for maintenance). The server 120 can also maintain data indicating locations of the airplanes 150. The operational capabilities can indicate the autonomous operations that the robot 110 can support (e.g., drilling, sealing, cleaning, etc.). Given the operational instructions, the status data, and the capability data, the on-server 120 can select a robot 110 (e.g., one that is available and capable to support the operational instructions) and instruct the robot 110 to move to the area that contains the airplane 150 or an jig holding an airplane part (machine part).

In another example, the remote computer system and robot 110 are configured to provide the EMS. In this case, the remote computer system can select and send operational instructions to a robot 110 based on the status data and the capability data.

In both EMS examples above, multiple operations may be needed to be performed and inter-dependencies between these operations may exist. For instance, to drill fastener holes on an airplane 150, the robot may need to first navigate to the airplane's 150 area, register the airplane 150 so that it can be located in a local coordinate system of the robot 150, auto-dock the robot 110 within a certain distance of the airplane 150, detect the locations for drilling, control the robotic arm to move to the locations according to a particular trajectory, and control the end effector to drill. Some of the operations can be computationally expensive and performed less frequently (e.g., generating a simultaneous localization and mapping (SLAM) map, registration), whereas other operations can be computationally less expensive but latency sensitive and performed more frequently (e.g., controlling the robotic arm and end effector). As such, the server 120 can execute processes for the computationally expensive/less frequently performed operations, whereas the robot 110 can locally execute processes for the remaining operations.

In an example, operations that necessitate utilization of central processing unit (CPU) resources (e.g., a number of CPU cycles), graphics processing unit resources (e.g., a number of GPU cycles), and/or memory resources (e.g., memory space) that exceeds a threshold value(s) can be offloaded to the server 120. Similarly, operations having a processing latency that can exceed a threshold value (e.g., that are not latency sensitive) can be offloaded to the server 120. Additionally or alternatively, operations performed at a frequency that is below a threshold value (e.g., not frequently performed) can be offloaded to the server 120. Additionally or alternatively, operations that necessitate power consumption that exceed a threshold value can be offloaded to the server 120.

In an example, the robot 110 can store a configuration table. The table can indicate, for each type of operation to be performed, whether the operation is to be performed locally to the robot 110 or remotely at the server 120. If remotely, the robot 110 can generate data needed for the operation and send this data along with a request to the server 120 indicating the operation. The server 120 can determine the corresponding process to execute and use the data as an input to the execution. The output of the execution can be sent as data to the robot 110.

As such, when the robot 110 receives operational instructions from the server 120, the robot 110 can determine which operations are to be performed locally or which ones are to be performed remotely. For the remote operations, the robot 110 can request their performance by the server 120 and receive back the results of the server 120 executing the corresponding operations. For the local operations, the robot 110 can execute the corresponding processes locally and can inform the server 120 of the results of these local operations (e.g., that a fastener hole was drilled at a particular location on the airplane 150).

In an example, the server 120 can manage remote operations for multiple robots 110 at the same time. For instance, the server 120 can execute multiple processes, queue other processes, and/or simultaneously receive multiple requests. When multiple operations are to be supported, the server 120 can implement a prioritization scheme such that at least some of the processes can be executed sequentially depending on their priority. The priority scheme can consider the priority of each requested operations, where the operational priorities can be predefined. Additionally or alternatively, the priority scheme can consider the currently used resources and the remaining available resources of the server 120. Additionally or alternatively, the priority scheme can consider the inter-dependencies between the operations of one robot 110 or of multiple robots 110. Additionally or alternatively, the priority scheme can consider the various operations scheduled for a robot 110. These and other features of the priority scheme are further described herein below.

Although FIG. 1 illustrates a single server 120 and describes a remote computer system, the embodiments of the present disclosure are not limited as such. For instance, the premises 140 can be used to manufacture and/or maintain airplanes or airplane parts for different airplane models. In this case, multiple servers can be housed on the premises 140 and multiple remote computer systems can be deployed. Each local server can be associated with one of the airplane models. Likewise, each remote computer system can be associated with one of the airplane models. In this example, a robot 110 can support multiple airplane models. As such, when a remote operation needs to be performed for the robot 110 in association with an airplane of a particular airplane model (or an airplane part thereof), the robot can determine and select the server 120 associated with that airplane model to then request this server to perform the operation. For instance, the server 120 can store an association table indicating the associations between on-premises servers and airplane models and can use this table in its server determination and selection.

Although FIG. 1 illustrates a single server 120 deployed on the premises 140 and associated with an airplane model, the embodiments of the present disclosure are not limited as such. For instance, multiple servers 120 associated with the same airplane model can be distributed across the premises 140 (e.g., in different buildings or in different areas within a same building of the premises 140). In this case, when a remote operation needs to be performed for the robot 110 in association with an airplane of the airplane model (or an airplane part thereof), the robot can determine and select one of such on-premises servers to then request this server to perform the operation. The selection can be based on different factors. One factor can be location. For instance, the robot 110 can select the server 120 that is closest thereto. In this illustration, the robot 110 can store location information indicating where each on-premises server is and can track its own location (e.g., via its navigation system) to then make the closest location determination and select the closes on-premises server. Using the closest server 120 can reduce the network latency associated with performing the operation. Another factor can be server availability or business. For instance, the servers 120 can broadcast periodically their availability or business to the robots 110. The robot 110 can then select a server 120 that is available and not busy.

Figure 2:
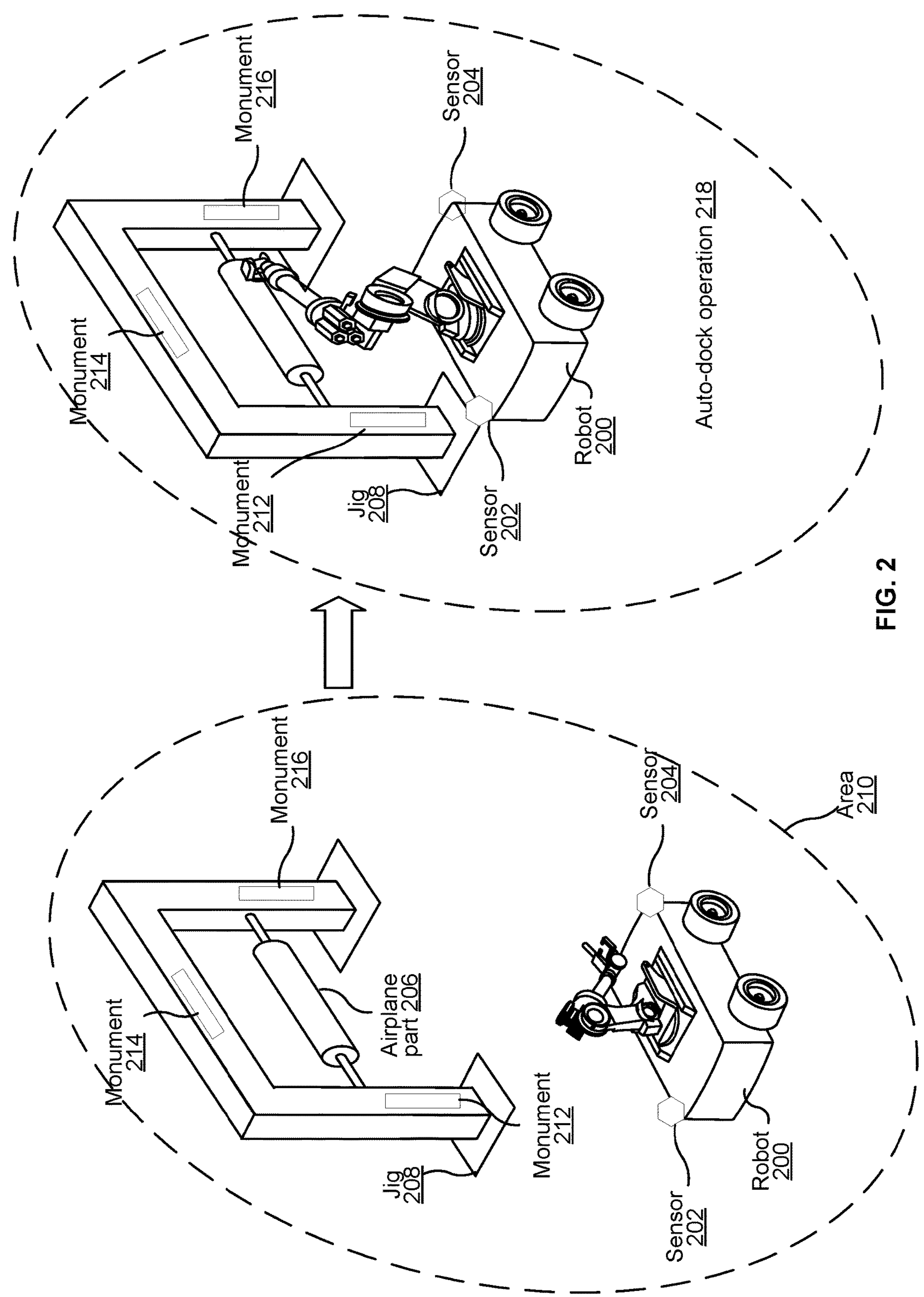
FIG. 2 illustrates an example auto-docking process for a robot, according to some embodiments.

FIG. 2 illustrates an example auto-docking process for a robot, according to some embodiments. FIG. 2 depicts a robot 200 with a certain sensor configuration using one or more sensors 202 and 204 interacting with an airplane part 206 held by a jig 208 in an area 210 of a facility. In embodiments, the airplane part 206 may be loaded to the jig 208 in the area 210 of the facility. The airplane part 206 may be a fuselage piece, an airplane wing, a tail portion, or any other portion of an airplane or machine part. The robot 200 may be deployed in the facility to perform different types of operations including auto-docking the robot 200 within a certain distance of the jig 208 and/or monuments 212-216 or executing a job on the airplane part 206. As used herein, an auto-dock operation 218 includes automatically moving the robot 200 from an initial location to within a certain distance (e.g., threshold distance) of the monuments 212-216 and/or the jig 208 and airplane part 206. The auto-dock operation 218 may include rotating the robot 200 and/or the robot arm and end effector of the robot 200. The auto-dock operation 218 may move the robot 200 within a certain distance of the monuments 212-216 and/or jig 208 and airplane part 206 so as to execute a particular job on the airplane part 206 given a type of the airplane part 206 and the particular job to be executed. For example, the robot 200 may be required to move within four inches of the monuments 212-216 to execute a drilling operation on the airplane part 206, whereas the robot 200 may be required to move within one inch of the monuments 212-216 to execute a sealant operation on the airplane part 206.

In embodiments, the sensors 202 and 204 may be configured to detect a configuration of monuments 212-216

(e.g., a presence, number, and location of monuments 212-216). For example, the sensors 202 and 204 may include optical, distance, and/or range sensors which can be used by the robot 200 to generate sensor input indicating a relative distance and angle relative to the positioning surfaces of the sensors 202 and 204 on robot 200. The sensor input obtained by sensors 202 and 204 may be processed by a computer system of robot 200 or transmitted to a local computer of the facility or a remote computer (outside the facility) that are in communication with the robot 200. The computer system may utilize a position algorithm that uses the sensor input to generate a linear transformation between a reference point of the robot 200 and another reference point of the jig 208 (e.g., the monuments 212-216). The computer system can then generate the data that defines the linear transformation such as X, Y, Z locations and rotation along each axis for use by the robot such as by localizing the jig 208 in a coordinate system using the linear transformation. An origin of the coordinate system may be one of the reference points. In embodiments, monuments 212-216 may include markers or objects which are associated with the jig 208 and airplane part 206 and located at set distances, locations, and orientations relative to the jig 208 and airplane part 206. An example of a monument may be a steel sheet which can be placed in a certain location to aid the robot 200 (computer system of the robot) in detecting, using sensors 202 and 204, the relative location and distance of jig 208 and airplane part 206 in an area 210 of a facility.

In embodiments, the computer system of the robot 200 may use the sensor input from sensors 202 and 204 as well as the position algorithm and linear transformation to determine a configuration of monuments 212-216 (e.g., location, number, and presence of monuments 212-216). The computer system may map the configuration of monuments 212-216 to a table of known configurations of monuments and jigs to determine a particular template associated with the matching monument configuration. For example, the computer system may maintain a table or other system for mapping known monument configurations to particular templates in a one-to-one relationship (e.g., each monument configuration corresponds to a unique template). Although a one-to-one relationship is described with reference to FIG. 2, embodiments disclosed herein are not as limited (e.g., a monument configuration may corresponds to more than one template). The particular template may be determined from a plurality of templates maintained by the computer system and identify a threshold distance, a job to be executed, an angle to rotate the robot 200 and/or arm(s) and end effector (s), and other information that can be used by the robot 200 to move (navigate) towards the jig 208 and execute a job for airplane part 206.

Once a particular template has been determined for the detected configuration of monuments 212-216 for jig 208 and airplane part 206, the computer system of the robot 200 may generate and implement instructions for moving the robot 200 towards the jig 208 and stop the robot 200 upon reaching the threshold distance as indicated by the particular template. The instructions may activate, stop, or modulate propulsion mechanisms of the robot 200. The computer system of the robot 200 may move the robot 200 towards the jig 208 as illustrated in FIG. 2 at auto-dock operation 218 by tracking updates to the linear transformation based on updated sensor input or input from the sensors 202 and 204 as the robot moves towards the jig 208. Upon reaching the threshold distance from the jig 208, the robot 200 may be instructed by the computer system to stop and rotate the robot 200 and/or the arm(s) and end effector(s) (not pictured) of the robot 200 to execute a job, as identified in the particular template, on airplane part 206. The rotation of robot 200 can occur prior to moving towards the jig 208, during movement towards the jig 208, or upon stopping movement of the robot 200 upon reaching the threshold distance from the jig 208 as identified in the particular template. The rotation or angle to put the robot 200 in to execute a job or complete the auto-dock operation 218 may be identified in the particular template that is determined from the sensor input of sensors 202 and 204.

The computer system of the robot 200 may implement a navigation system that tracks its location relative to the location of the jig using the sensor input from sensors 202 and 204 as the robot moves towards the jig 208. The instructions for moving the robot 200 towards the jig 208 may be updated as updated input is obtained by the sensors interacting with monuments 212-216 and/or jig 208. Although the description above describes using certain sensors for sensors 202 and 204 for determining a distance between the robot 200 and the monuments 212-216 other sensor systems or algorithms may be used to determine the distance and navigate the robot 200 to the jig 208 to execute an auto-dock operation 218. For example, the computer system of the robot 200, local computer, or remote computer, may implement an object detection algorithm or computer vision algorithm that processes optical markers and/or machine readable codes. For example, sensors 202 and 204 may correspond to image capturing devices (camera systems) which can detect markers mounted to airplane part 206 and/or jig 208 that are in positions and locations similar to monuments 212-216.

The computer system may utilize the computer vision algorithm or object detection algorithm along with the images (sensor input) captured by the image capturing devices (sensors 202 and 204) to perform image processing to identify the markers and perform geometric reconstruction. The identified markers can also be compared to images of known configurations of markers or monuments to determine a particular template for use by the robot 200 in moving to a threshold distance to the jig 208. For example, the computer system 200 may implement a machine learning algorithm that compares received images to known images to identify a particular configuration that maps to a particular template. The particular template can identify the jig 208, the airplane part 206, a threshold distance to stop the robot 200 when moving the robot 200 towards the jig 208, an angle to rotate the robot 200 or parts of the robot, and a job to execute on the airplane part 206. The output of these algorithms can indicate a linear transformation between a reference point of the robot 200 and another reference point of the airplane part 206. The computer system of the robot 200 can send data that defines the linear transformation, such as X, Y, Z locations and rotation along each axis to the robot 200 that then localizes the airplane part 206 in its own coordinate system using the linear transformation. The origin of the coordinate system may be one of the reference points. Once the linear transformation is determined, the computer system may generate and implement instructions for moving the robot 200 to the jig 208 to execute the auto-docking operation 218 (e.g., move towards the jig 208, stop upon reaching the threshold distance, and rotate the robot 200 or parts of the robot such as an arm and/or end effectors of the arm) and further execute a job on airplane part 206.

Figure 3:
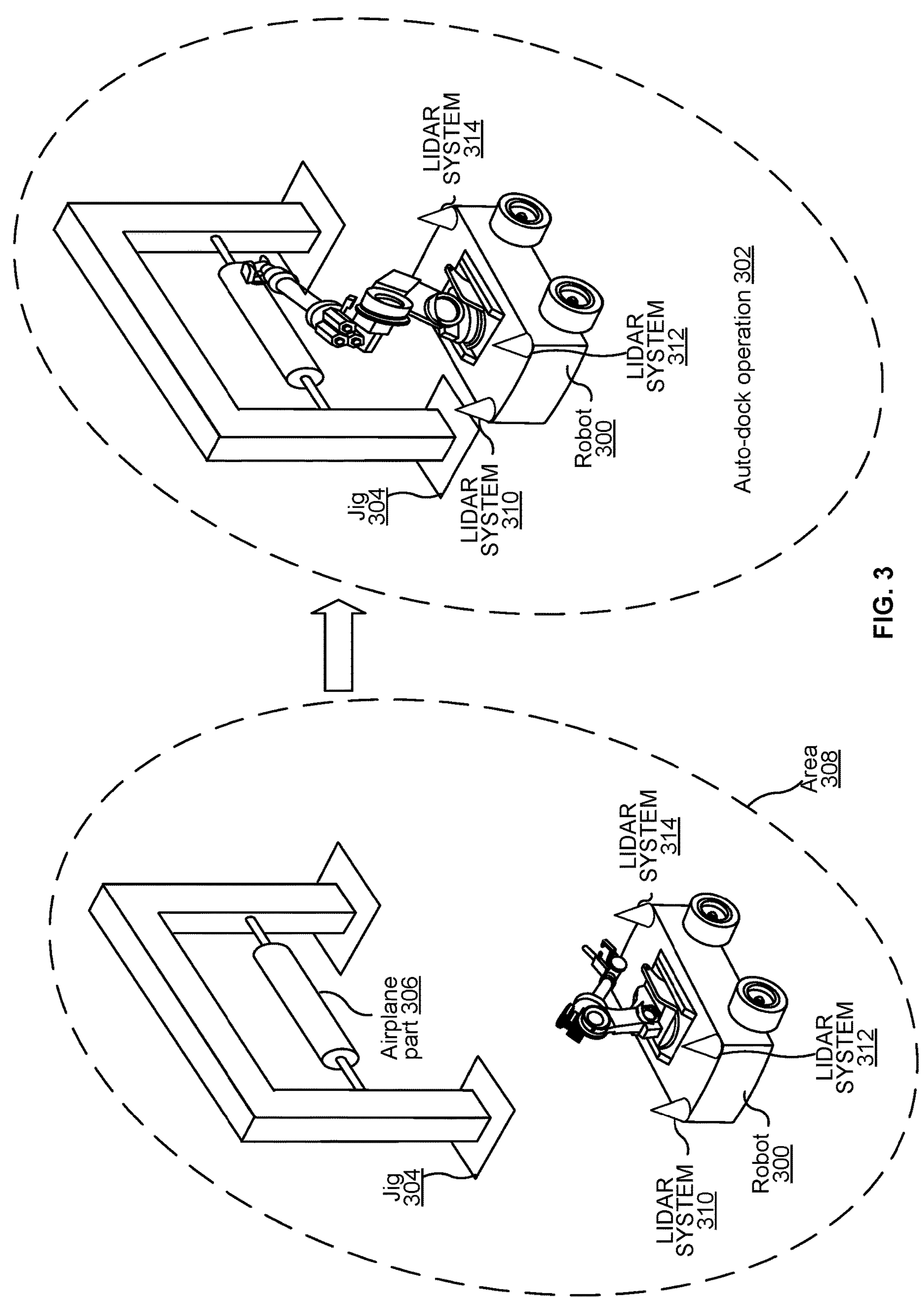
FIG. 3 illustrates an example auto-docking process for a robot, according to some embodiments.

FIG. 3 illustrates an example auto-docking process for a robot, according to some embodiments. In embodiments, the computer system of robot 300, the local computer, or remote computer (not pictured) may maintain a SLAM map of the facility and can provide portions of the SLAM map to the robot 300 for use in executing an auto-dock operation 302 to move the robot 300 towards the jig 304. Once the robot 300 has executed the auto-dock operation 302 and is within a threshold distance of the jig 304, the robot can perform or execute other operations on the airplane part 306 held by or loaded on jig 304 such as a sealing operation or a cleaning operation. FIG. 3 depicts a jig 304 holding an airplane part 306 in an area 308 of a facility. The robot 300 may be deployed in the facility to perform different types of operations including auto-docking (302) the robot 300 within a certain distance of the jig 304 or executing a job on the airplane part 306. As used herein, the auto-dock operation 302 includes automatically moving the robot 300 from an initial location to within a certain distance (e.g., threshold distance) of the jig 304 and airplane part 306. The auto-dock operation 302 may include rotating the robot 300 and/or the robot arm and end effector (not pictured) of the robot 300. The auto-dock operation 302 may move the robot 300 within a certain distance of the jig 304 and airplane part 306 so as to execute a particular job on the airplane part 306 given a type of the airplane part 306 and the particular job to be executed.

FIG. 3 also depicts several LIDAR systems 310-314 associated with the robot 300. The LIDAR systems 310-314 may include one or more sensors that are configured to capture point cloud data or information about an area around the robot 300 (e.g., within a certain distance of the robot 300 which corresponds to the detection range of the sensors of the LIDAR system). The computer system of the robot 300 can receive and process sensor input obtained by LIDAR systems 310-314 to generate a feature map of an area around the robot 300, detect a jig 304, and compare the feature map to SLAM maps for the area 308 or jig 304 and airplane part 306 to determine a particular template. Although FIG. 3 does not depict monuments associated with jig 304 embodiments disclosed herein include using LIDAR systems 310-314 to obtain a configuration of monuments associated with jig 304 and determining a particular template for the jig 304 and airplane part 306. In embodiments, the sensor input from LIDAR systems 310-314 can be used by the computer system of the robot 300 that implements an artificial neural network (ANN) model that performs point cloud matching. The point cloud may be generated from sensor input obtained by LIDAR systems 310-314 and may include information for the jig 304 and airplane part 306.

The ANN model implemented by the computer system of the robot 300 may determine a reference point cloud to be used based on a marker or identification of the airplane part 306. The ANN model may use the point cloud from the sensor input obtained by LIDAR systems 310-314 as well as the reference point cloud to determine a linear transformation between a reference point of the robot 300 and the jig 304. The computer system of the robot 300 can use the data that defines the linear transformation, such as X, Y, Z locations and rotation along each axis, to localize the jig 304 and/or airplane part 306 in a local coordinate system of the robot using the transformation. The origin of the coordinate system may be the reference point. In embodiments, the computer system of the robot 300 may use an ANN model that performs data-fused 3D object detection. For instance, using the LIDAR systems 310-314, the computer system of the robot 300 can generate, from the point cloud, a three-dimensional (3D) model of at least a part of the jig 304 and/or airplane part 306. In some embodiments, the robot 300 may include one or more RGB cameras (not pictured) which can be used to generate a two-dimensional (2D) model (e.g., a set of one or more 2D images) of the jig 304 and/or airplane part 306. In either scenario, the computer system of the robot 300 can determine a particular template which can include a reference multi-dimensional model to be used (e.g., by retrieving a reference 3D model and/or a reference 2D model).

As described herein, the particular template can also identify a threshold distance, an angle to rotate the robot 300 or parts of the robot 300, such as an arm and/or end effector, and a job to execute upon completion of the auto-dock operation 302. The computer system of the robot 300 can input the data-fused representation(s) and the reference data-fused representation(s) to the ANN model. The output of the AI model can indicate a linear transformation between a reference point of the robot 300 and the jig 304 and/or airplane part 306. The computer system of the robot 300 can use the data that defines the linear transformation, such as X, Y, Z locations and rotation along each axis for localizing the jig 304 and/or airplane part 306 in its own coordinate system using the transformation. The origin of the coordinate system may be the reference point. Once the linear transformation is determined, the computer system may generate and implement instructions for moving the robot 300 to the jig 304 to execute the auto-docking operation 302 (e.g., move towards the jig 304, stop upon reaching the threshold distance, and rotate the robot 300 or parts of the robot such as an arm and/or end effectors of the arm) and further execute a job on airplane part 306. The comparison of the models described above can also be used to determine a particular template associated with the jig 304 and airplane part 306.

Figure 4:
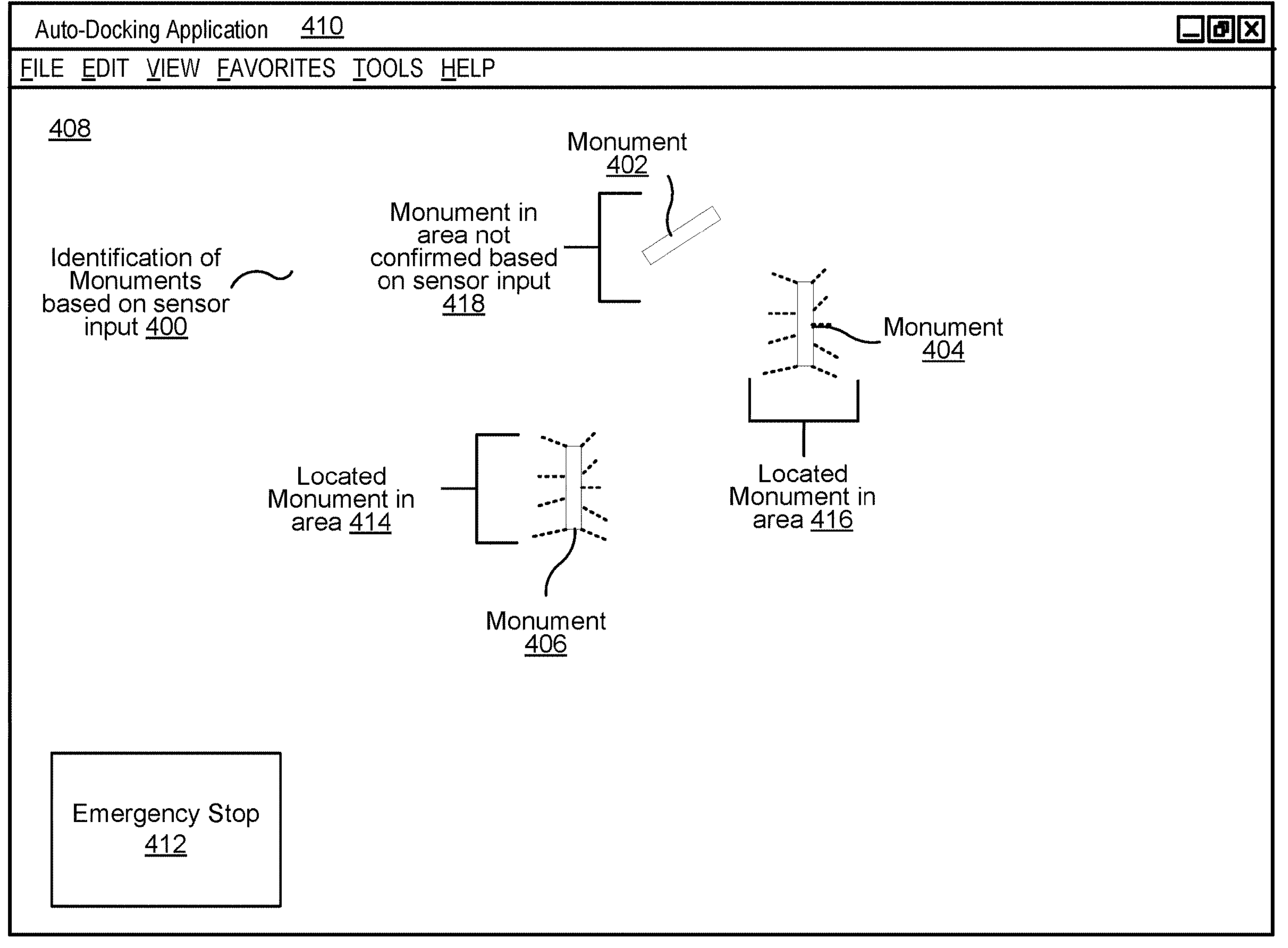
FIG. 4 illustrates an example user interface for presenting features of a robot and auto-docking process, according to some embodiments.

FIG. 4 illustrates an example user interface for presenting features of a robot and auto-docking process, according to some embodiments. FIG. 4 depicts an identification of monuments 400, the monuments 402-406 that are identified are presented via a user interface 408 of an application 410 (Auto-Docking Application). In embodiments, the user interface 408 and application 410 may be implemented and presented on the robot executing an auto-docking operation and other operations, such as executing a job on an airplane part affixed to a jig upon completing the auto-docking process. A user interacting with or otherwise providing input to the robot, via the user interface, may interact with the user interface to confirm certain determinations made by the computer system of the robot (the robot) or that were transmitted to the robot/computer system of the robot from a local or remote computer system. The user interface 408 and features described with reference to FIG. 4 may also be presented via a computer system or computer device such as a mobile device, desktop computer, laptop, table computer, etc., associated with a user.

To continue the example of a user interacting with user interface 408, the user interface may include an emergency stop feature 412. A user may interact with the emergency stop feature 412 to cause the computer system of the robot, local, or remote, to generate, transmit, and implement instructions for stopping movement of the robot during the auto-docking process to a detected jig and airplane part. For example, instructions may be generated, received, and executed to stop propulsion mechanisms of the robot from moving the robot further during execution of an operation such as an auto-docking operation or executing a job operation for a machine part associated with a jig. As described herein, the robot may use sensor input of associated sensors to detect or identify one or more monuments associated with a jig. For example, laser sensor systems of a robot that use time of flight processes may detect a location, number, and presence of one or more monuments associated with a jig holding a machine part As illustrated in FIG. 4, the computer system of the robot may update the user interface 408 to present a representation of the detected monuments 402, 404, and 406 for the identification of monuments process 400 based on sensor input. As described with reference to FIG. 3, although sensor systems may include different types of laser sensors or LIDAR systems, embodiments of the current disclosure are not limited to such sensors. For example, the robot may include one or more image capturing devices which capture images of nearby objects. A computer system (e.g., a computer system of the robot, local computer, remote computer) may receive the images, use object detection algorithms or trained machine learning algorithms to identify the monuments, jig, machine part, and generate representations of the objects (monuments, jig, machine part) for presentation via user interface 408. As depicted in FIG. 4, certain monuments may be in resolution or identification range (414 and 416), whereas some of the monuments may not yet be identified or detected to such a resolution to confirm location or presence (e.g., 418) based on the sensor input. In embodiments, the robot may continue to process sensor input received by the sensors for the monuments 402-406 until all monuments are completely detected (e.g., presence, number, and location). Upon completing resolution or complete detection of monument 402, the user interface 408 may be updated to include an indicator of resolution such as 414 and 416. In embodiments, the location may include X, Y, and Z coordinates in a coordinate system or planes relative to a known position of the robot, the arm and end effector of the robot, or the sensors of the robot in the same coordinate system. The detected monuments may be used by the computer system to determine a particular template from a plurality of templates for executing an auto-docking procedure and/or one or more jobs for a machine part held by a jig that the robot has auto-docked within a certain distance of.

Figure 5:
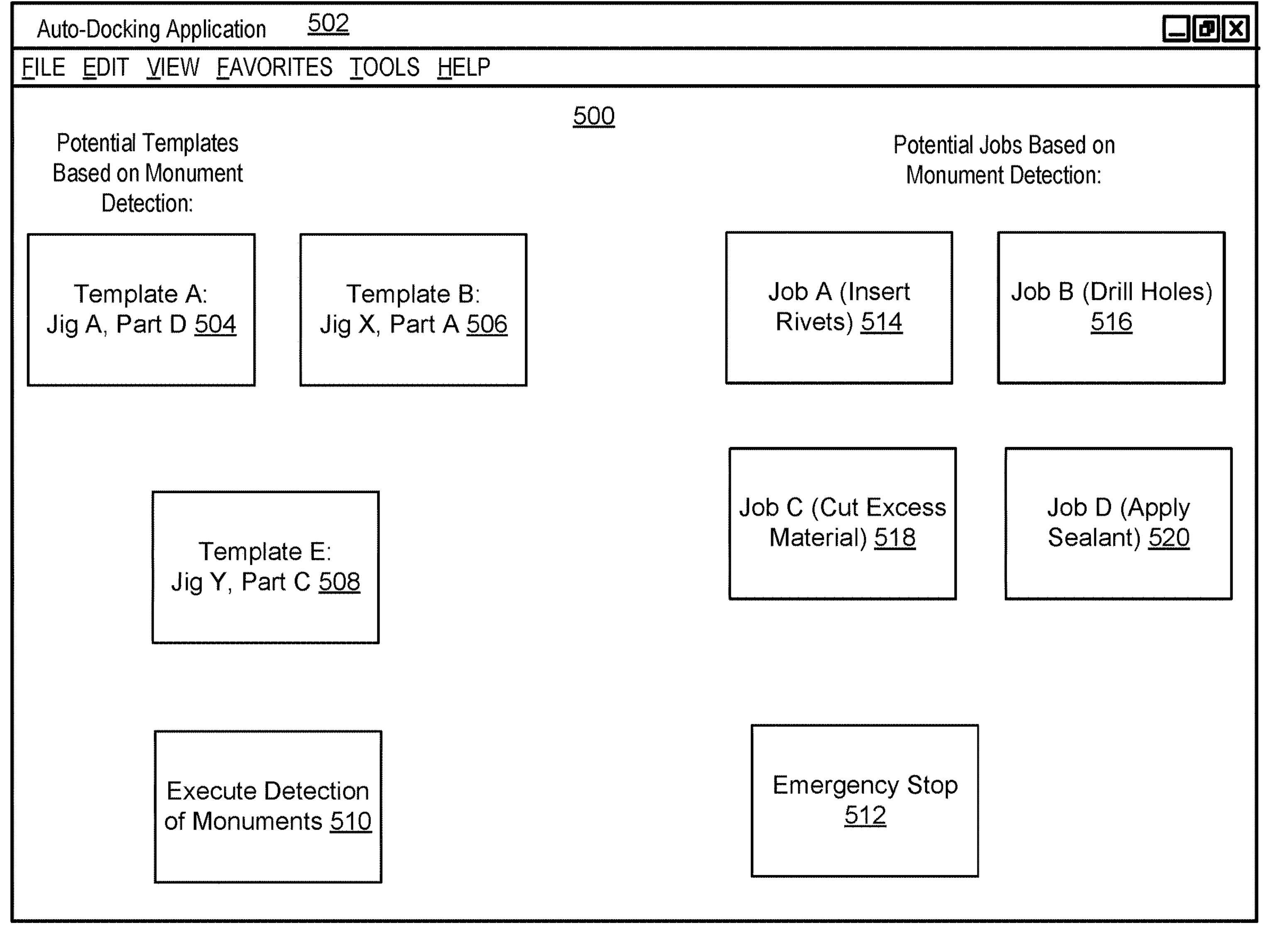
FIG. 5 illustrates an example user interface for presenting features of a robot and auto-docking process, according to some embodiments.

FIG. 5 illustrates an example user interface for presenting features of a robot and auto-docking process, according to some embodiments. FIG. 5 depicts user interface 500 presented via application 502 (Auto-Docking Application) that further presents one or more features associated with an auto-docking procedure and/or executing a job for a machine part held by a jig in a facility. For example, the user interface 500 may be presented upon the computer system of the robot, local, remote, determining a number, location, and presence of one or more monuments associated with a jig and/or machine part. The features may include one or more potential templates which may correspond to the determined presence, location, and number of monuments at 504-508. In embodiments, the computer system may automatically determine the particular template and complete an auto-docking procedure.

In some embodiments, potential templates 504-508 which are closest to the determined configuration of monuments based on the sensor input may be presented via user interface 500. A user associated with or otherwise interacting with the robot may interact with user interface 500 to select a particular template from the potential templates 504-508. Each potential template 504-508 may include a description of a particular jig and machine part which is associated with each template based on the determined configuration of the monuments using the sensor input of the robot. In embodiments, if none of the potential templates 504-508 appear to match the current configuration of monuments associated with the jig and machine part, a user may instruct the robot and associated sensor system to re-detect the configuration of monuments (510). Upon such an instruction the user interface 500 may be updated to present different potential templates which match the newly detected configuration of monuments.

Similar to FIG. 4, the user interface 500 may present an emergency stop 512 feature for generating, transmitting, and implementing instructions for stopping a robot from moving towards the jig and machine part during an auto-docking process and/or executing a job with the machine part and jig upon reaching the threshold distance of the auto-dock procedure. FIG. 5 also depicts the presentation of potential jobs 514-520 which correspond to the potential templates 504-508 and/or which correspond to the current configuration of the monuments for the jig and machine part. In embodiments, the potential jobs 514-520 may be determined based on a known configuration of the robot, a type or number of robot arm(s) of the robot, and type or number of end effectors of the robot arm(s). As depicted in FIG. 5, the potential jobs 514-520 may include a short description of the job associated with the feature (e.g., "Insert Rivets," "Drill Holes"). Although FIG. 5 presents features for selecting potential templates 504-508 and potential jobs 514-520, embodiments described herein include the computer system selecting a particular template based on the determined configuration of the monuments (e.g., determination of number, location, and presence of monuments) associated with a jig and machine part. The particular template may identify and include instructions for the robot executing an auto-docking procedure and job upon completing the auto-docking procedure such as threshold distance to move the robot towards the monuments, rotation to adjust the robot, and job to execute thereby removing the need for human input via user interface 500.

Figure 6:
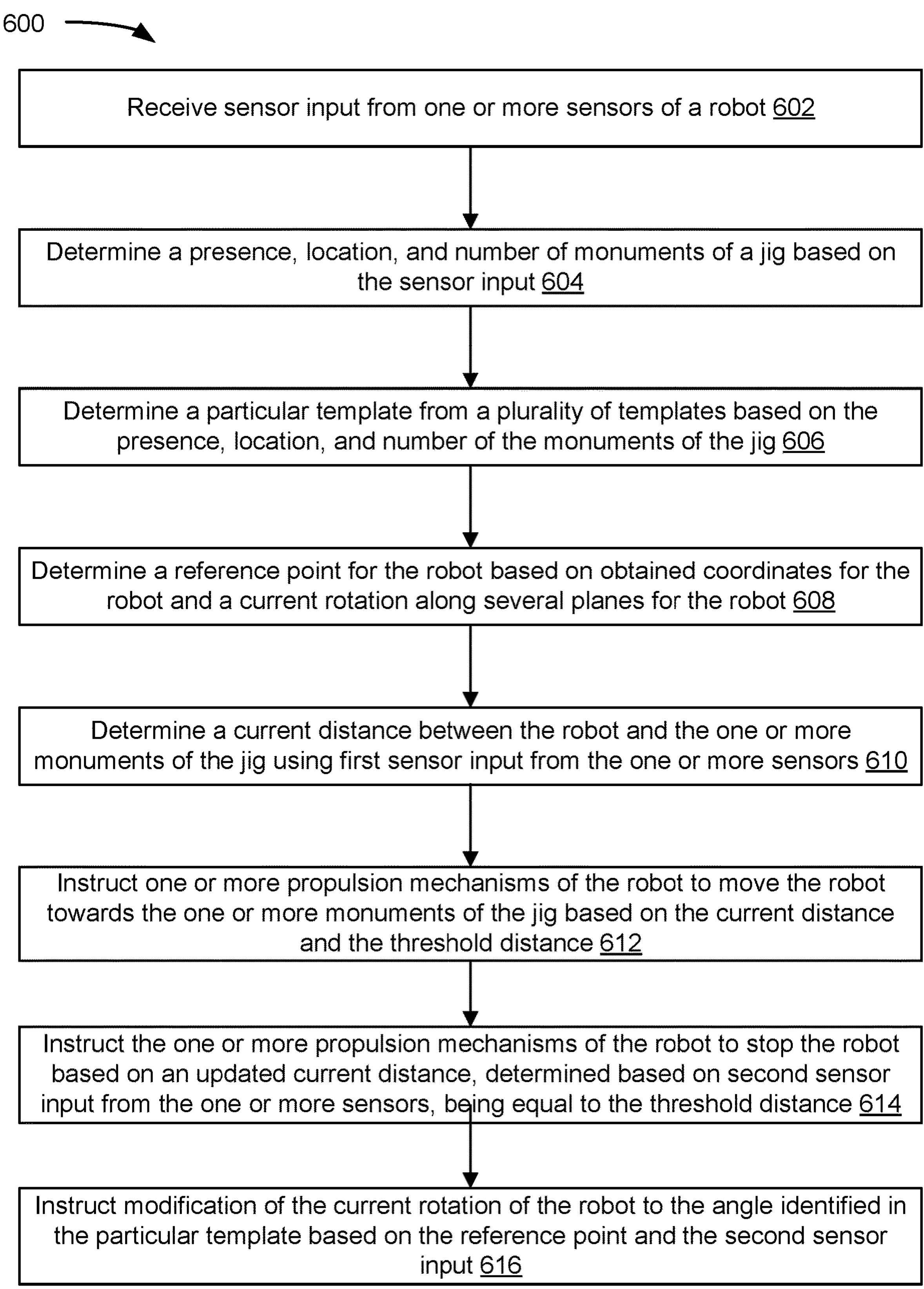
FIG. 6 illustrates an example of a flow for an auto-docking process of a robot, according to some embodiments.
Figure 7:
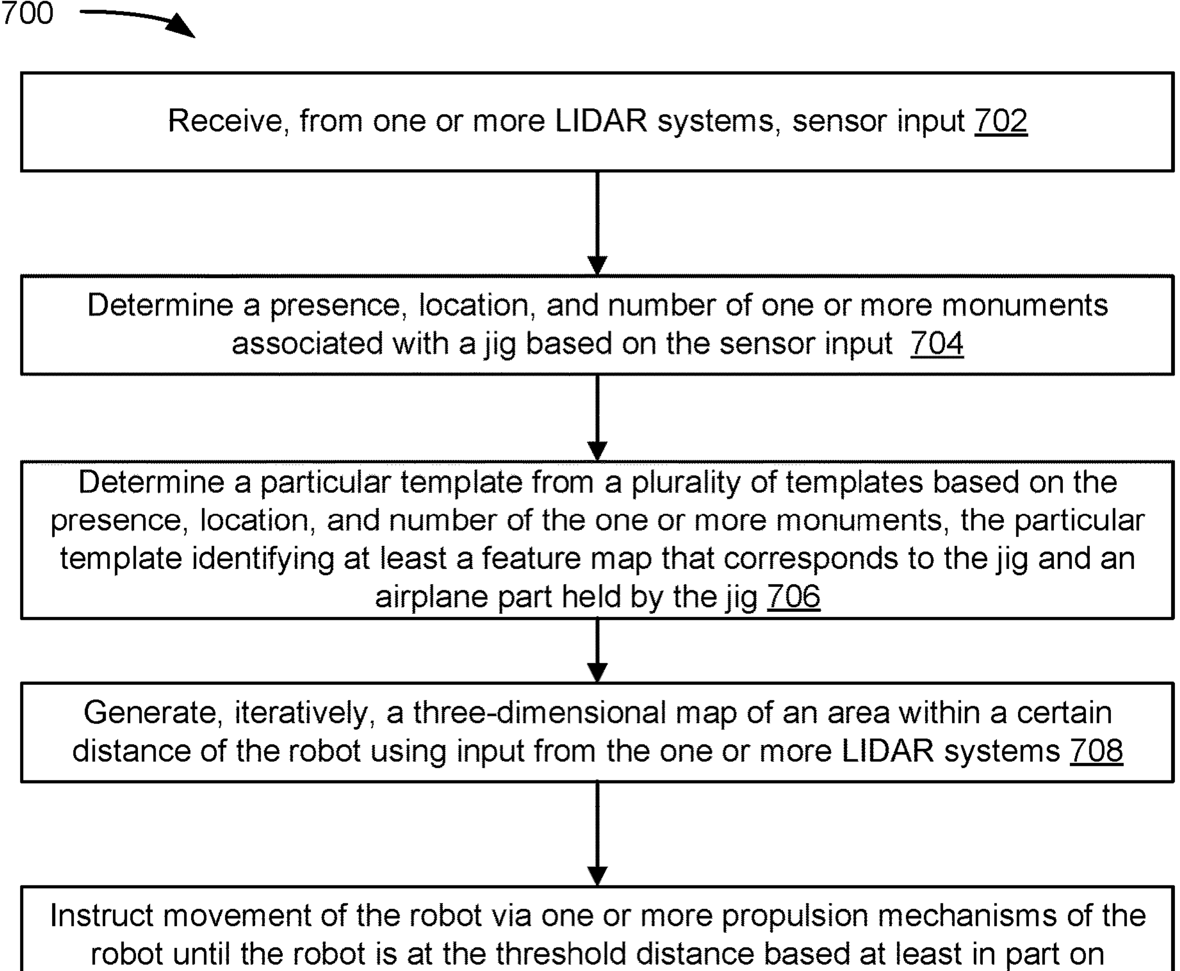
FIG. 7 illustrates an example of a flow for an auto-docking process of a robot, according to some embodiments.

FIGS. 6 and 7 illustrate flows executable by a computer of the robot or a computer/server in communication with the robot—which can be located on the premises of the facility or remotely such as a cloud implemented computer. Some or all of the instructions for performing the steps of the flows can be implemented as hardware circuitry and/or stored as computer-readable instructions on a non-transitory computer-readable medium of a computer systems of the robot, the local computer, or the remote computer. As implemented, the instructions represent modules that include circuitry or code executable by processors of the computer system. The use of such instructions configures the computer system to perform the specific steps described herein. Each circuitry or code in combination with the relevant processor(s) represent a means for performing a respective step(s). While the steps are illustrated in a particular order, it should be understood that no particular order is necessary and that one or more steps may be omitted, skipped, performed in parallel, and/or reordered.

FIG. 6 illustrates an example of a flow 600 for auto-docking a robot, according to some embodiments. In an example, the flow 600 includes a step 602, where computer system (e.g., of the robot, local, or remote) receives sensor input from one or more sensors of the robot. For instance, a robot may include one or more time of flight sensors which continuously pulse or operate to receive sensor input of objects which the lasers intersect with during operation and determine a distance from the intersected objects. The sensor input can be received in an application programming interface (API) call from the robot.

In an example, the flow includes a step 604, where the computer system determines a presence, location, and number of monuments of a jig based on the sensor input. The computer system may use the sensor input to detect the presence and number of monuments in the sensor view as well as the location of the monuments relative to the robot based on a known location of the sensors and/or robot. In an illustrative use case, the robot is near the jig which is holding or otherwise associated with a machine part, such as an airplane part, that is ready for an operation or job to be executed upon it. In embodiments the computer may compare the location and number of the monuments to a plurality of templates where each template has a unique location and number of monuments and corresponds to a particular jig, airplane part, job, threshold distance, and rotation of the robot to execute the job.

In an example, the flow includes a step 606, where the computer system determines a particular template from a plurality of templates based on the information determined for the monuments of the jig. As mentioned above, the particular template may specify a particular jig, airplane part, job, threshold distance, and rotation of the robot to execute the job. The computer system may maintain a plurality of templates and compare the monument information to monument information for each of the templates to find one that matches the location, presence, and number of monuments detected by the sensor input from the sensors of the robot.

In an example, the flow includes a step 608, where the computer system determines a reference point for the robot based on obtained coordinates for the robot and a current rotation along several planes for the robot. In embodiments, the computer system may use known information for the robot including X, Y, Z coordinates for the robot and a current rotation along each of these axes to determine a reference point for the robot. In some embodiments, the computer system may receive an image, from an external sensor or image capturing device, that includes an image of the robot, an arm of the robot, and an end effector of the robot. The computer system may utilize known information for a location of the robot as well as other information to determine a reference point for the robot relative to the jig and machine part.

In an example, the flow includes a step 610, where the computer system determines a current distance between the robot and the one or more monuments of the jig using first sensor input from the one or more sensors. For instance, the sensors of the robot may continuously obtain sensor input (first sensor input) as the robot is near the jig and as it moves towards the jig in later steps. In cases where the sensors are time of flight laser sensors the distance is determined based on the time taken to provide a signal and receive a response from the sensor upon impacting an object and returning to the sensor.

In an example, the flow includes a step 612, where the computer system instructs one or more propulsion mechanisms of the robot to move the robot towards the one or more monuments of the jig based on the current distance of the robot and the threshold distance identified in the particular template.

In an example, the flow includes a step 614, where the computer system instructs the one or more propulsion mechanisms of the robot to stop the robot based on an updated current distance, determined based on second sensor input from the one or more sensors, being equal to the threshold distance. For instance, the second sensor input from the one or more sensors may represent continual generation of sensor input by the sensors of the robot as the robot moves towards the jig. The computer system may be configured to use the continually provided sensor input to determine a current distance of the robot to the jig, as the robot moves, until the current distance is equal to the threshold distance (e.g., two inches from the monument).

In an example, the flow includes a step 616, where the compute system instructs modification of the current rotation of the robot to the angle identified in the particular template based on the reference point and the second sensor input. For instance, the computer system may instruct the robot to rotate from a current angle, along an X axis, Y axis, or Z axis, or multiple axes at once, to match the angle identified in the particular template. The rotation of the robot may be required by the job to be executed on the machine part held by the jig in order for the arm and end effector of the robot to properly execute the job (e.g., reach all relevant portions of the machine part to perform an autonomous operation). It should be noted that although the flow 600 describe laser sensors and time of flight sensors the embodiments described herein are not limited to these sensor types. Other sensors such as phase change identification sensors or luminosity intensity change identification sensors may be utilized. Other sensors such as LIDAR systems, image capturing devices, and other appropriate sensors may be utilized to determine a distance of the robot from a jig (e.g., monuments of a jig) and associated machine part.

FIG. 7 illustrates an example of a flow 700 for auto-docking a robot, according to some embodiments. In an example, the flow 700 includes a step 702, where the computer system receives sensor input from one or more LIDAR systems. In embodiments, the LIDAR systems may include one or more sensors, such as laser sensors, and be situated at certain locations on the robot. As described above with reference to FIG. 6, the computer system may be the computer system of the robot, a local computer system external to the robot but in communication with the robot, or a remote computer system that is in communication with the robot.

In an example, the flow 700 includes a step 704, where the computer system determines a presence, location, and number of one or more monuments associated with a jig based on the sensor input. In embodiments, the computer system may determine a reference point of the robot and/or an arm and end effector of the arm based on obtained X, Y, and Z coordinates for the robot as well as a current rotation of the robot relative to the ground or the detected jig.

In an example, the flow 700 includes a step 706, where the computer system determines a particular template from a plurality of templates based on the presence, location, and number of the one or more monuments. The particular template may identify at least a feature map that corresponds to the jig, associated airplane part, and monuments. In embodiments, the feature map may correspond to data points or a data object generated via a simultaneous localization and mapping (SLAM) map for the jib, machine part, and monument(s). In embodiments, the computer system may deactivate a portion of the LIDAR systems based on the determined particular template. The computer system may also activate additional LIDAR systems of the robot based on the determined particular template. External sensors (e.g., sensors not attached to otherwise incorporated to the robot) may also provide sensor input to the computer system for identifying the jig, machine part, and monuments as well as the position of the robot, current rotation of the robot, and surrounding area of the robot for generating a 3D map of the area around the robot. Modular sensors may be attached to the robot during the auto-docking process and removed upon reaching the threshold distance.

In an example, the flow 700 includes a step 708, where the computer system generates, iteratively, a 3D map of an area within a certain distance of the robot using input from the one or more LIDAR systems. In embodiments, the computer system may utilize the input from the LIDAR systems to generate and continually update the 3D map that is provided via a process such as SLAM.

In an example, the flow 700 includes a step 710, where the computer system instructs movement of the robot towards the jig and monuments via one or more propulsion mechanisms of the robot until the robot is at the threshold distance. The robot may be instructed to move based on the computer system continuously comparing the 3D map of the area within the certain distance of the robot to the feature map that corresponds to the jig, machine part, and/or monuments.

Figure 8:
FIG. 8 illustrates an example of components of a computer system, according to some embodiments.
Figure 8:
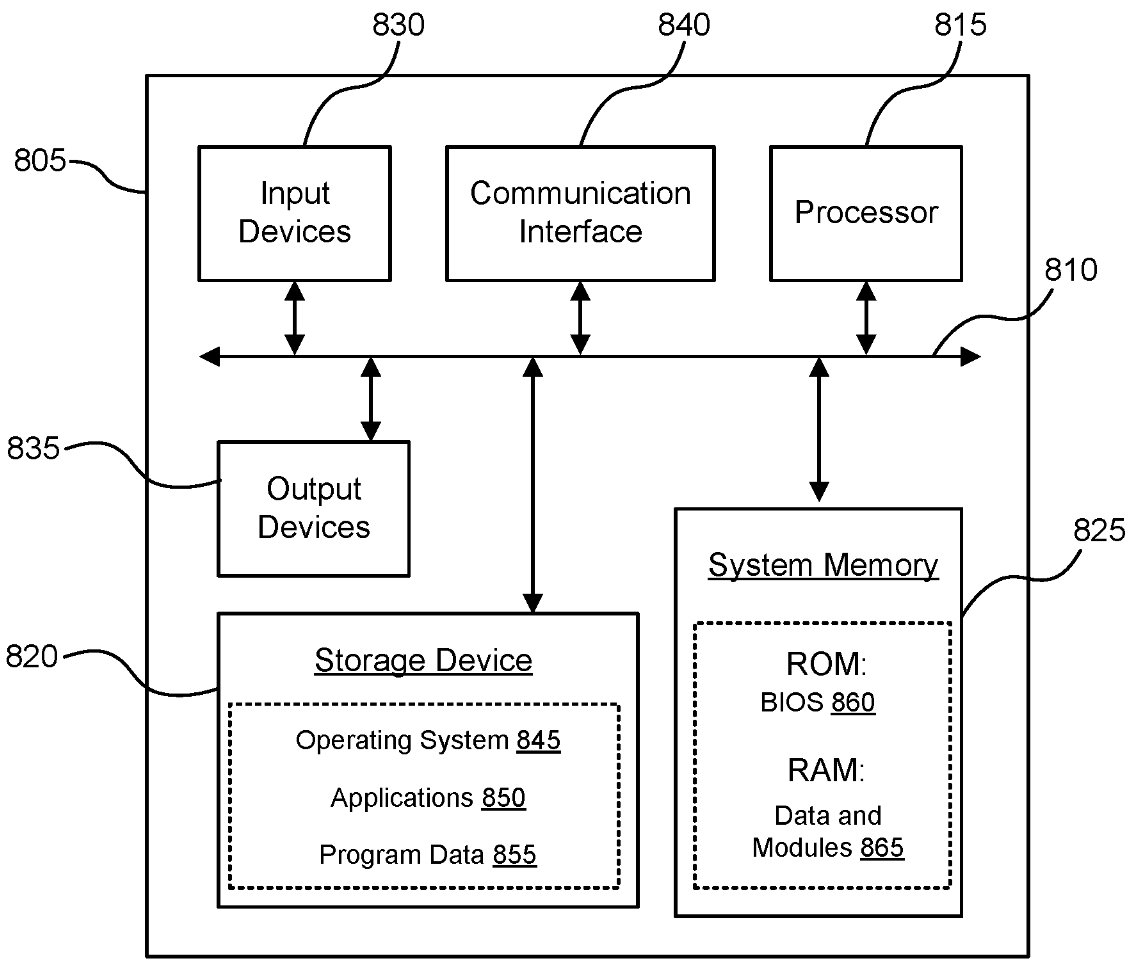

FIG. 8 illustrates an example of components of a computer system 800, according to some embodiments. The computer system 800 can be implemented as a component of a robot (or any low-tier device), a local computer (computer external to the robot but located in the same facility), or a remote computer (computer external to the robot but located in a remote location). As shown in FIG. 8, the computer system 800 may include a bus 810, processor 815, a storage device 820, a system memory (hardware device) 825, one or more input devices 830, one or more output devices 835, and a communication interface 840.

The bus 810 permits communication among the components of computer system 800. For example, bus 810 may be any of several types of bus structures including a memory bus or memory controller, a peripheral bus, and a local bus using any of a variety of bus architectures to provide one or more wired or wireless communication links or paths for transferring data and/or power to, from, or between various other components of computer system 800.

The processor 815 may be one or more processors, microprocessors, or specialized dedicated processors that include processing circuitry operative to interpret and execute computer-readable program instructions, such as program instructions for controlling the operation and performance of one or more of the various other components of computer system 800 and/or robot (not pictured) for implementing the functionality, steps, and/or performance of the present invention. In certain embodiments, processor 815 interprets and executes the processes, steps, functions, and/or operations of the present disclosure, which may be operatively implemented by the computer readable program instructions.

The storage device 820 may include removable/non-removable, volatile/non-volatile computer-readable media, such as, but not limited to, non-transitory machine-readable storage medium, such as magnetic and/or optical recording media and their corresponding drives. The drives and their associated computer-readable media provide for storage of computer-readable program instructions, data structures, program modules and other data for operation of computer system 800 in accordance with the different aspects of the present invention. In embodiments, storage device 820 may store operating system 845, application programs 850, and program data 855 in accordance with aspects of the present invention.

The system memory 825 may include one or more storage mediums, including for example, non-transitory machine-readable storage medium, such as flash memory, permanent memory, such as read-only memory ("ROM"), volatile memory, such as random-access memory ("RAM"), any other suitable type of non-transitory storage component, or any combination thereof. In some embodiments, an input/output system 860 (BIOS) including the basic routines that help to transfer information between the various other components of computer system 800, such as during start-up, may be stored in the ROM. Additionally, data and/or program modules 865, such as at least a portion of operating system 845, program modules, application programs 850, and/or program data 855, that are accessible to and/or presently being operated on by processor 815, may be contained in the RAM.

The one or more input devices 830 may include one or more mechanisms that permit an operator to input information to computer system 800, including, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 835 may include one or more mechanisms that output information to an operator, such as, but not limited to, audio speakers, headphones, audio line-outs, visual displays, antennas, infrared ports, tactile feedback, printers, user interfaces, or combinations thereof.

The communication interface 840 may include any transceiver-like mechanism (e.g., a network interface, a network adapter, a modem, or combinations thereof) that enables computer system 800 to communicate with remote devices or systems, such as a mobile device or other computing devices such as a server in a networked environment, e.g., cloud environment. For example, computer system 800 may be connected to remote devices, systems, or sensor systems via one or more local area networks (LAN) and/or one or more wide area networks (WAN) using communication interface 840.

As discussed herein, the computer system 800 may perform tasks (e.g., process, steps, methods and/or functionality) in response to processor 815 executing program instructions contained in non-transitory machine-readable storage medium, such as a system memory 825. The program instructions may be read into system memory 825 from another computer-readable medium (e.g., non-transitory machine-readable storage medium), such as data storage device 820, or from another device via the communication interface 840 or server within or outside of a cloud environment. In embodiments, an operator may interact with computer system 800 via the one or more input devices 830 and/or the one or more output devices 835 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

receiving, by a computer system, sensor input from one or more sensors of a robot; determining, by the computer system, a presence of one or more monuments of a jig, a location for each of the one or more monuments, and a number of the one or more monuments based at least in part on the sensor input, the jig configured to hold an airplane part;

determining a plurality of potential templates based on determining the presence of the one or more monuments; presenting the determined plurality of potential templates;

determining, by the computer system, a particular template of the plurality of templates based at least in part on the presence of the one or more monuments, the location for each of the one or more monuments, the presenting of the determined plurality of potential templates, and the number of the one or more monuments, the particular template identifying the airplane part, a threshold distance to stop the robot from the jig, and an angle to rotate the robot relative to a plane of the jig;

determining, by the computer system, a reference point for the robot based at least in part on obtained X, Y, Z coordinates for the robot and a current rotation along an X axis, Y axis, and Z axis;

determining, by the computer system, a current distance between the robot and the one or more monuments of the jig using first sensor input from the one or more sensors;

instructing, by the computer system, one or more propulsion mechanisms of the robot to move the robot towards the one or more monuments of the jig based at least in part on the current distance and the threshold distance;

instructing, by the computer system, the one or more propulsion mechanisms of the robot to stop the robot based at least in part on an updated current distance, determined based at least in part on second sensor input from the one or more sensors, being equal to the threshold distance; and instructing, by the computer system, modification of the current rotation of the robot to the angle identified in the particular template based at least in part on the reference point and the second sensor input, wherein the angle to rotate the robot corresponds to an orientation of the robot allowing an arm and an end effector of the robot to reach all portions of the airplane part specified in a job.

2. The computer-implemented method of claim 1, wherein the robot further comprises an arm and an end effector of the arm, and wherein the particular template further specifies the job to execute for the airplane part using the arm and the end effector.

3. The computer-implemented method of claim 2, further comprising instructing, by the computer system, the robot to execute the job for the airplane part using the arm of the robot and the end effector.

4. The computer-implemented method of claim 1, wherein the one or more sensors include time of flight sensors, optical sensors, phase change identification sensors, or luminosity intensity change identification sensors.

5. The computer-implemented method of claim 1, wherein the robot further comprises an arm and an end effector of the arm, and wherein determining the reference point for the robot is further based at least in part on an obtained image of the robot, the arm, and the end effector.

6. A system comprising: a robot having an end effector, an arm, and one or more propulsion mechanisms, the robot configured to use the end effector and the arm to execute a job for an airplane part associated with a jig, the jig configured to hold the airplane part;

one or more light detection and ranging (LIDAR) systems, a LIDAR system of the LIDAR systems including one or more laser sensors;

a computer system comprising one or more processors and one or more memories storing instructions that, upon execution by the one or more processors, configured to the computer system to:

receive, from the one or more LIDAR systems, sensor input;

determine a presence of one or more monuments associated with the jig, a location for each of the one or more monuments, and a number of the one or more monuments based at least in part on the sensor input;

determine a plurality of potential templates based on determining the presence of the one or more monuments;

present the determined plurality of potential templates;

determine a particular template of the plurality of templates based at least in part on the presence of the one or more monuments, the number of the one or more monuments, the presenting of the determined plurality of potential templates, and the location for each of the one or more monuments, the particular template identifying the airplane part, a threshold distance to stop the robot from the jig, an angle to rotate the robot relative to a plane of the jig, and a feature map that corresponds to the jig and the airplane part;

generate, iteratively, a three-dimensional map of an area within a certain distance of the robot using input from the one or more LIDAR systems;

instruct movement of the robot via the one or more propulsion mechanisms until the robot is at the threshold distance based at least in part on continuously comparing the three-dimensional map of the area within the certain distance of the robot to the feature map that corresponds to the jig and the airplane part; and instruct modification of a current rotation of the robot to the angle identified in the particular template based at least in part on the input from the one or more LIDAR systems, wherein the angle to rotate the robot corresponds to an orientation of the robot allowing the arm and the end effector of the robot to reach all portions of the airplane part specified in a job.

7. The system of claim 6, wherein the one or more memories store additional instructions that, upon execution by the one or more processors, configure the computer system to determine a reference point for the robot based at least in part on obtained X, Y, Z coordinates for the robot and current rotation along an X axis, Y axis, and Z axis.

8. The system of claim 6, wherein the one or more memories store additional instructions that, upon execution by the one or more processors, configure the computer system to instruct the robot to execute a particular job specified by the particular template using the arm and end effector.

9. The system of claim 6, wherein the one or more LIDAR systems are located at particular locations of the robot.

10. The system of claim 6, wherein the one or more memories store additional instructions that, upon execution by the one or more processors, configure the computer system to:

generate a user interface for presenting a status of the robot and one or more features associated with the robot;

receive, via the user interface, user input indicating an interaction with an emergency stop feature, the emergency stop feature of the one or more features; and instruct the robot to cease moving in response to receiving the user input.

11. The system of claim 10, wherein the user interface is configured to present the plurality of potential templates based at least in part on the sensor input and the presence of the one or more monuments, the location for each of the one or more monuments, and the number of the one or more monuments.

12. The system of claim 10, wherein the user interface is configured to present a plurality of potential jobs to be executed by the robot based at least in part on the sensor input and the presence of the one or more monuments, the location for each of the one or more monuments, and the number of the one or more monuments.

13. A computer system comprising:

one or more processors; and one or more memories storing instructions that, upon execution by the one or more processors, configure the computer system to:

receive, from one or more light detection and ranging (LIDAR) systems of a robot, sensor input, a LIDAR system of the one or more LIDAR systems including one or more laser sensors;

determine, a presence of one or more monuments associated with a jig, a location for each of the one or more monuments, and a number of the one or more monuments based at least in part on the sensor input, the jig configured to hold an airplane part;

determine a plurality of potential templates based on determining the presence of the one or more monuments;

present the determined plurality of potential templates;

determine a particular template of the plurality of templates based at least in part on the presence of the one or more monuments, the number of the one or more monuments, the presenting of the determined plurality of potential templates, and the location for each of the one or more monuments, the particular template identifying the airplane part, a threshold distance to stop the robot from the jig, an angle to rotate the robot relative to a plane of the jig, and a feature map that corresponds to the jig and the airplane part;

generate, iteratively, a three-dimensional map of an area within a certain distance of the robot using input from the one or more LIDAR systems;

instruct (i) movement of the robot via one or more associated propulsion mechanisms until the robot is at the threshold distance and (ii) modification of a current rotation of the robot to the angle identified in the particular template based at least in part on continuously comparing the three-dimensional map of the area within the certain distance of the robot to the feature map that corresponds to the jig and the airplane part, wherein the angle to rotate the robot corresponds to an orientation of the robot allowing an arm and an end effector of the robot to reach all portions of the airplane part specified in a job.

14. The computer system of claim 13, wherein the one or more memories store additional instructions that, upon execution by the one or more processors, configure the computer system to: deactivate a portion of the one or more LIDAR systems based at least in part on the particular template.

15. The computer system of claim 13, wherein the one or more memories store additional instructions that, upon execution by the one or more processors, configure the computer system to obtain, via a camera of the robot, an image of the jig that includes a machine readable code associated with the jig, the machine readable code specifying the particular template, wherein determining the particular template is based at least in part on the image and the machine readable code.

16. The computer system of claim 13, wherein the one or more memories store additional instructions that, upon execution by the one or more processors, configure the computer system to receive, via a sensor component that is external to the robot, additional sensor input, wherein generating the three-dimensional map of the area within the certain distance of the robot is further based at least in part on the additional sensor input.

17. The computer system of claim 16, wherein the sensor component that is external to the robot includes an imaging capture device.

18. The computer system of claim 13, wherein the one or more memories store additional instructions that, upon execution by the one or more processors, configure the computer system to: train a machine learning algorithm to identify the jig and the airplane part based at least in part on images of the jig and the airplane part, wherein determining the particular template is based at least in part on using the machine learning algorithm and the images of the jig and the airplane part.

19. The computer system of claim 13, wherein the one or more memories store additional instructions that, upon execution by the one or more processors, configure the computer system to:

receive, via a camera of the robot, an image of the jig and the airplane part; and implement an object detection algorithm using the image of the jig and the airplane part to determine the particular template.

20. The system of claim 6, wherein the particular template further identifies the job to be executed by the robot on the airplane part.

* * * * *